Figure 1:
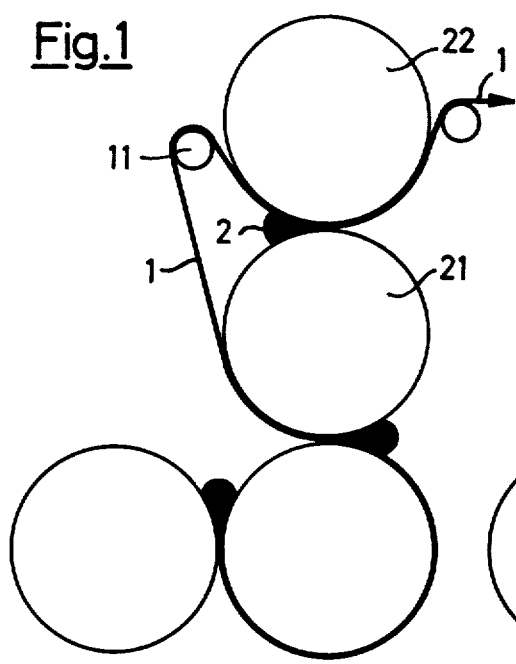

United States Patent [19]

Herner et al.

[11] 3,876,737

[45] Apr. 8, 1975

[54] MANUFACTURE OF CALENDERED SHEETING OF THERMOPLASTIC MATERIALS

[75] Inventors: Martin Herner, Ludwigshafen; Guenter Mueller, Lambsheim; Guenter Hatzmann, Eppelheim, all of Germany

[73] Assignee: Badische Anilin- & Soda-Fabrik Aktiengesellschaft, Ludwigshafen, Rhine, Germany

[22] Filed: Dec. 6, 1972

[21] Appl. No.: 312,747

[30] Foreign Application Priority Data
Dec. 7, 1971  Germany............................ 2160520

[52] U.S. Cl. ................. 264/40; 264/175; 264/237; 264/349; 425/337; 425/363
[51] Int. Cl............................................... B29d 7/14
[58] Field of Search ............ 264/175, 280, 40, 237, 264/349; 425/363, 335, 337

[56] References Cited
UNITED STATES PATENTS

| | | | |
|---|---|---|---|
| 806,625 | 12/1905 | Beecher............................ 264/175 |
| 1,590,638 | 6/1926 | Marquette ........................ 425/363 |
| 2,236,214 | 3/1941 | Jones................................ 264/175 |
| 2,326,927 | 8/1943 | Conrad............................. 425/337 |
| 2,946,087 | 7/1960 | Haroldson et al. ................ 264/175 |
| 3,328,503 | 6/1967 | Ancker.............................. 264/175 |
| 3,346,913 | 10/1967 | Lake et al........................... 425/337 |
| 3,658,978 | 4/1972 | Ancker.............................. 264/175 |

*Primary Examiner*—Jeffery R. Thurlow
*Attorney, Agent, or Firm*—Johnston, Keil, Thompson & Shurtleff

[57] ABSTRACT

Manufacture of calendered sheeting of thermoplastic materials, particularly polyvinyl chloride, which is free from flow lines. The calendered web of plastics material, on passing from the penultimate calender roll to the final calendar roll, is cooled by passing over smaller guide rolls. The resulting calendered sheeting may be used for the usual purposes, especially in packaging.

7 Claims, 3 Drawing Figures

MANUFACTURE OF CALENDERED SHEETING OF THERMOPLASTIC MATERIALS

This invention relates to a process for the manufacture of calendered sheeting of thermoplastics, particularly polyvinyl chloride, which is free from flow lines.

The manufacture of sheeting by calendering is well known and is described, for example, in Kunststoff-Handbuch, published by Carl-Hanser-Verlag, VOl. II, "Polyvinylchlorid," pp. 358–369. The said process consists in preplasticizing the powdered material and then passing it through a train of heated rolls rotating in opposite directions, in order to compress and plasticize the material and finally convert it to sheeting.

It is well known that sheeting made by calendering plastics materials by this high-temperature process exhibits flow lines in the form of V-patterns and whirls, which impair the appearance of the sheeting to a considerable extent. It may be assumed that these flow lines are caused by uneven compression of the slug of plastics material at the nip of the final pair of rolls.

It is an object of the invention to provide a process in which the above phenomena are avoided.

This object is achieved by removing the calendered web of thermoplastic material from the penultimate calender roll, as considered in the draw-off direction, and passing it over guide rolls so as to cool it by from approximately 3° to 30°C and preferably from 5° to 15°C, and then returning it to the final calender roll.

This cooling operation increases the viscosity of the slug at the final nip so that the resulting pressure in the nip is sufficiently high to press out the flow lines as the material passes through said nip, to render said lines invisible.

The more obvious method of cooling the slug at the final nip, namely direct cooling (i.e., reduced heating) of the final roll, causes an increase in the viscosity but leads to turbidity at the surface of the sheeting. It is therefore surprising that the process of the invention produces sheeting which is free from flow lines and at the same time shows no loss of transparency.

Suitable thermoplastic materials are preferably vinyl chloride polymers, particularly polyvinyl chloride having a K value of from 55 to 65 (as measured by German Standard Specification DIN 53,726); although copolymers of vinyl chloride, for example copolymers containing up to 30 percent by weight of vinylidene chloride, vinyl esters, acrylic esters, acrylonitrile or olefins, as well as polyvinyl chloride which has been modified to improve its impact resistance may also be used. Olefin polymers, such as polyethylene and polypropylene, and styrene polymers may also be calendered to sheeting by our process.

The essence of the invention lies in the fact that the web of thermoplastic material is cooled before it contacts the final roll. Normally, the slug at the final nip has a temperature of from 200° to 220°C. The measure of the invention causes this temperature to be reduced by from 3° to 30°C and preferably by from 5° to 15°C. The said temperature differential is to be taken as an average value, the surface of the web obviously being cooled to a slightly greater degree than its interior.

The web is removed from the penultimate roll by passing it over one or more guide rolls generally having a diameter of from 3 to 10 cm. That is to say, they are about ten times smaller than normal calender rolls, which have diameters of from 40 to 70 cm. Advantageously, the guide rolls are driven, their peripheral speed being adapted to the speed of travel of the web. To avoid sagging of the web, it is advantageous to increase the speed of rotation of the final roll to a value slightly higher than that of the penultimate calender roll.

It should be possible to control the temperature of the guide rolls in order to effect controlled cooling of the web. In general, it is sufficient to adjust the temperature of the guide rolls to from 190° to 200°C. This temperature control enables the pressure in the final nip to be adjusted to suit all thicknesses of sheeting and all draw-off speeds by varying the viscosity of the slug. The thicknesses of the sheeting are in the usual range of 200 to 1,000 $\mu$m.

It has also been found advantageous to give the guide rolls a comparatively rough surface, as may be produced by sandblasting for example. That is to say, the guide rolls, unlike normal calender rolls, should not be polished, as this would cause the risk of the web sticking to the guide rolls.

Three embodiments of the invention are illustrated by way of example in the accompanying drawings.

Referring to FIG. 1, cooling of the web of sheeting 1 is carried out by means of one roll 11 only. This holds the web at a distance from the penultimate calender roll 21, the web being cooled thereby and then returned to the final calender roll 22, where the slug 2 is formed at the nip. After passing through this nip, the web emerges as the finished sheeting which must be further cooled by known methods and may, if desired, be drawn.

Figure 2:
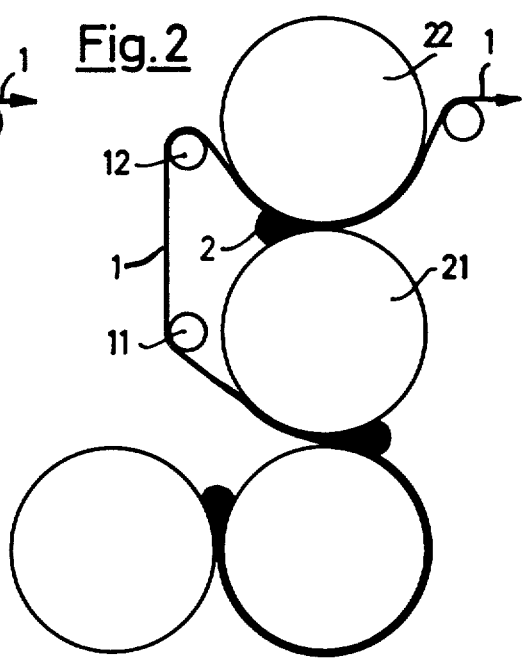

Referring to FIG. 2, cooling is effected by means of two rolls. The first guide roll 11 is at the level of the axis of the penultimate calender roll 21, whilst the second guide roll 12 is just below the level of the axis of the final calender roll 22.

Figure 3:
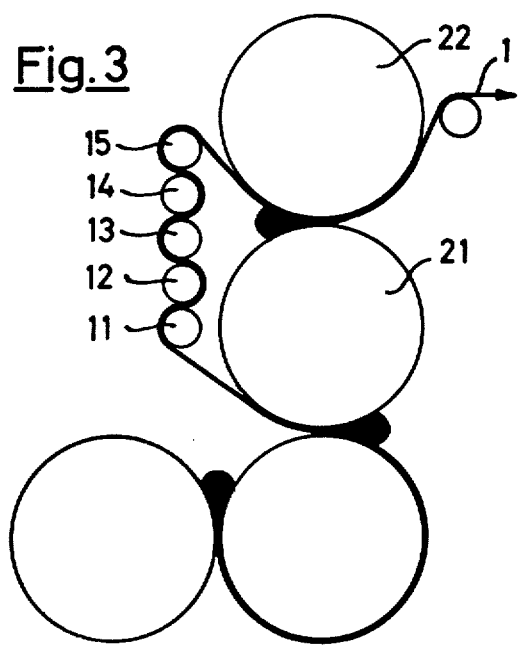

FIG. 3 shows a system of a series of guide rolls 11 to 15, by means of which a good cooling effect is achieved.

We claim:

1. In a process for the manufacture of sheeting of vinyl chloride polymers wherein preplasticizing powdered vinyl chloride polymer is passed through a train of heated calender rolls rotating in opposite directions and the formed web is removed from the penultimate calender roll, the improvement which comprises effecting controlled cooling of the web to eliminate flow lines by passing said web over one or more guide rolls, said guide roll or rolls being driven at a peripheral speed which is adjusted to the speed of the web, said guide roll or rolls being heated to a temperature lower than the temperature of said calender rolls so that said web is cooled by from 3° to 30°C, passing said web to the nip of the final calender roll, and cooling said web after it is removed from said final calender roll.

2. A process as set forth in claim 1, wherein said final calender roll is rotated at a slightly higher speed than the speed of the penultimate calender roll.

3. A process as set forth in claim 1, wherein the diameter of each calender roll is from 40 to 70 cm. and the diameter of each of the guide roll or rolls is from 3 to 10 cm.

4. A process as set forth in claim 1, wherein the temperature of the final nip is from 200° to 220° C.

5. A process as set forth in claim 1, wherein polyvinyl chloride having a K value of from 55 to 65 is used.

6. A process as set forth in claim 1, wherein the calendered web is cooled by from 5° to 15° C. before it is returned to the final calender roll.

7. A process as set forth in claim 1, wherein the sheeting has thicknesses of from 200 to 1,000 $\mu$m.

* * * * *